United States Patent [19]
Roth et al.

[11] Patent Number: 5,683,140
[45] Date of Patent: Nov. 4, 1997

[54] EASY ENTRY SEAT ASSEMBLY SYSTEM

[75] Inventors: Richard A. Roth, Walled Lake; Thomas D. Novitsky, Plymouth; Gary C. George, Northville; Michael T. Twomley, Westland; Omar D. Tame, West Bloomfield; Phillip J. Hecksel, Belleville, all of Mich.

[73] Assignee: Chrysler Corporation, Auburn Hills, Mich.

[21] Appl. No.: 591,185

[22] Filed: Dec. 19, 1995

[51] Int. Cl.⁶ .................................................. A47C 1/02
[52] U.S. Cl. .................... 297/344.1; 297/341; 248/394; 248/429
[58] Field of Search ..................... 297/341, 344.1, 297/325, 326, 329; 248/393, 429, 430, 394; 296/65.1

[56] References Cited

U.S. PATENT DOCUMENTS

| | | |
|---|---|---|
| 1,846,374 | 2/1932 | Toncray et al. . |
| 2,181,671 | 11/1939 | Simpson et al. . |
| 2,261,728 | 11/1941 | Lawler . |
| 3,347,512 | 10/1967 | Campbell . |
| 4,269,446 | 5/1981 | Gersmann et al. . |
| 4,395,011 | 7/1983 | Torta . |
| 4,607,884 | 8/1986 | Heling . |
| 4,634,180 | 1/1987 | Zaveri et al. .................... 297/341 |
| 4,639,038 | 1/1987 | Heling . |
| 4,846,520 | 7/1989 | Acuto et al. . |
| 4,961,559 | 10/1990 | Raymor . |
| 4,993,679 | 2/1991 | Urai et al. . |
| 5,145,232 | 9/1992 | Dal Monte .................... 297/329 |
| 5,207,480 | 5/1993 | Johnson et al. ................ 248/394 X |
| 5,393,121 | 2/1995 | Reuss et al. .................. 297/329 |

FOREIGN PATENT DOCUMENTS

| | | | |
|---|---|---|---|
| 2155780 | 10/1985 | United Kingdom | .................. 297/341 |

*Primary Examiner*—Laurie K. Cranmer
*Attorney, Agent, or Firm*—Roland A. Fuller, III

[57] ABSTRACT

A vehicle seat support frame includes inboard and outboard support assemblies each having a longitudinal base member providing an upstanding strut supporting an elevated front pivot pin. The base member aft end is formed with a downwardly and rearwardly angled brace having a foot pivotally connected to the lower end of a rear link. The link upper end is pivoted to an aft end of a longitudinal carriage having an elongated side slot receiving the elevated front pivot pin, wherein with the link inclined rearwardly the elevated pin is positioned at a front slot limit. A lower rail, fixed on the carriage, slidably supports an upper track member fixed to a seat cushion frame, for seat assembly adjustment. An easy entry dump arrangement allows a seat back to be pivoted from a normal use position to a forward dump position rotating a track cam plate, thereby unlatching the track members for travel to their full forward position, wherein a cam plate finger contacts a latch arm forward end follower to pivot the arm out of latched retention of the rear links. The released links are free to rotate forwardly and slide the carriages on their elevated pins to their rear slot limit positions, whereby the seat cushion travels forwardly along a circular arc, about the link lower pivots, inclining the seat cushion forwardly and downwardly to pass under the instrument panel to its easy entry dump position.

8 Claims, 10 Drawing Sheets

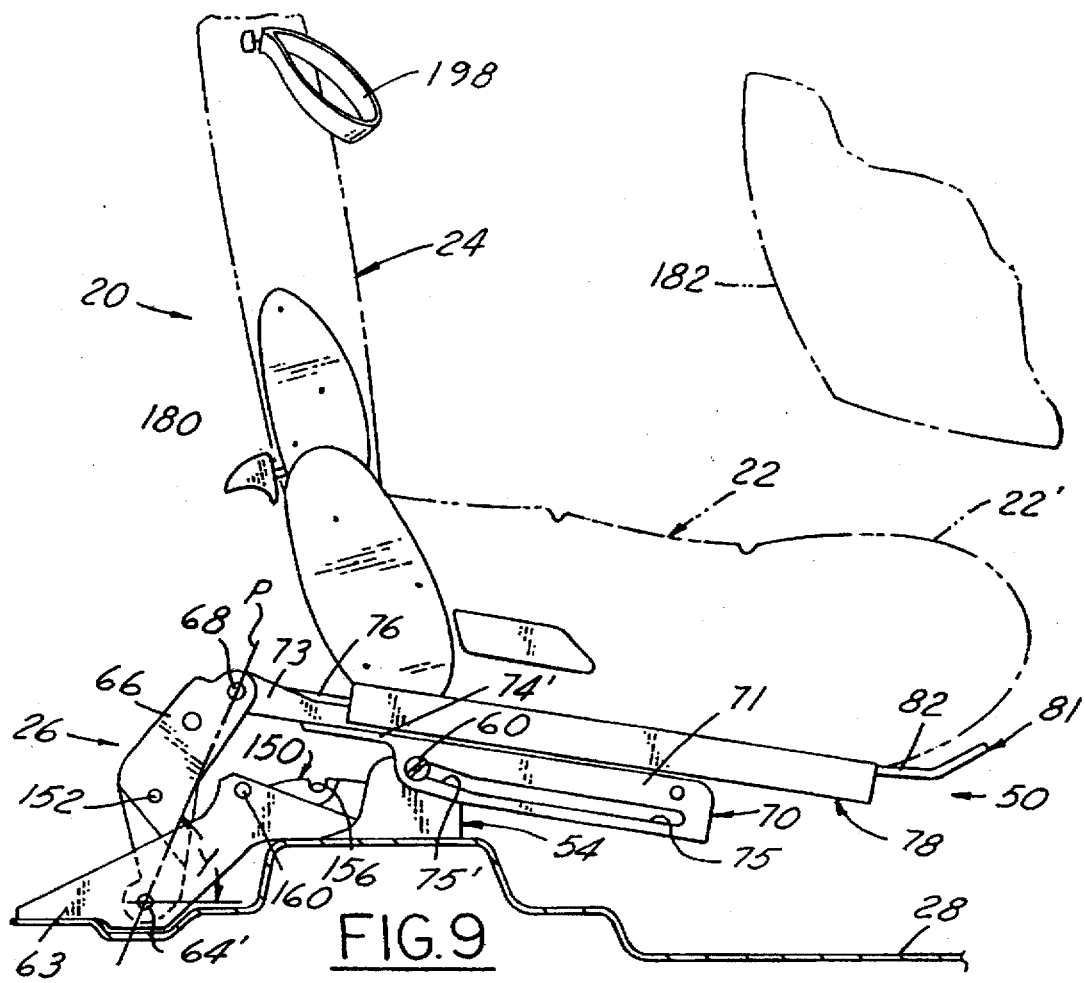

5,683,140

EASY ENTRY SEAT ASSEMBLY SYSTEM

FIELD OF THE INVENTION

This invention relates to a vehicle seat assembly and, more particularly, to a seat adjuster arrangement incorporating a forward "dump" position which provides maximum seat travel, thereby allowing ready access to rear seating positions of the vehicle.

BACKGROUND OF THE INVENTION

It is known in vehicle seat assemblies to provide a manually operated seat back recliner with a single position memory dump mechanism which enables the seat back to be rotated about a transverse axis from a normal use position to a forward dump location to improve access to the rear areas of the vehicle. One drawback with such seat adjusters is that in smaller passenger vehicles, such as compact or sport utility type vehicles, portions of the seat support hardware remain in the area required for foot placement when entering or exiting the rear seating positions. Another drawback of such known seat adjuster mechanisms is that they are relatively heavy and costly to manufacture. Also such mechanisms fail to provide a latch release arrangement which is easily accessible to a user upon entering the vehicle.

SUMMARY OF THE INVENTION

The present invention provides a forward dump arrangement for a vehicle seat assembly which allows maximum space for passenger ingress and egress to rear seating positions.

It is another feature of the invention to provide a forward dump arrangement for an existing vehicle seat adjuster mechanism such that, when actuated, a minimal amount of hardware remains in the area required for foot placement when entering and exiting the rear seating positions.

It is still another feature of the invention to provide dual actuators for the easy entry vehicle seat dump arrangement wherein one actuator is located for easy access by rear seat occupants, while a second actuator is easily accessible for persons outside the vehicle.

It is yet another feature of the invention to provide an easy entry dump arrangement for a vehicle seat wherein the seat assembly travels to its dump position about a circular arc, wherein the seat cushion is inclined forwardly and downwardly to an easy entry position under the instrument panel.

These and other features and advantages of the invention will be more fully understood from the following detailed description of the invention taken together with the accompanying drawings.

BRIEF DESCRIPTION OF THE DRAWINGS

In the drawings:

FIG. 9 is a view similar to FIG. 5 showing the seat adjuster in its forward easy-entry dump position;

FIG. 10 is a view similar to FIG. 6 showing the inboard seat adjuster in its forward easy-entry dump position;

DETAILED DESCRIPTION OF THE INVENTION

Figure 1:
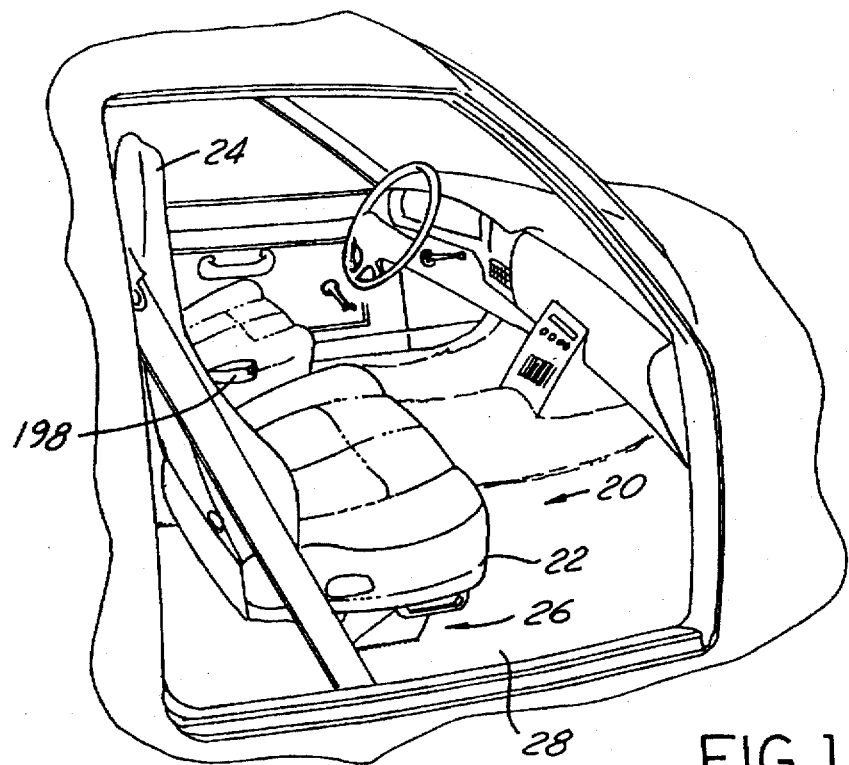
FIG. 1 is a fragmentary perspective view of a vehicle body passenger compartment front seat assembly according to the present invention showing the seat in its normal use position.
Figure 2:
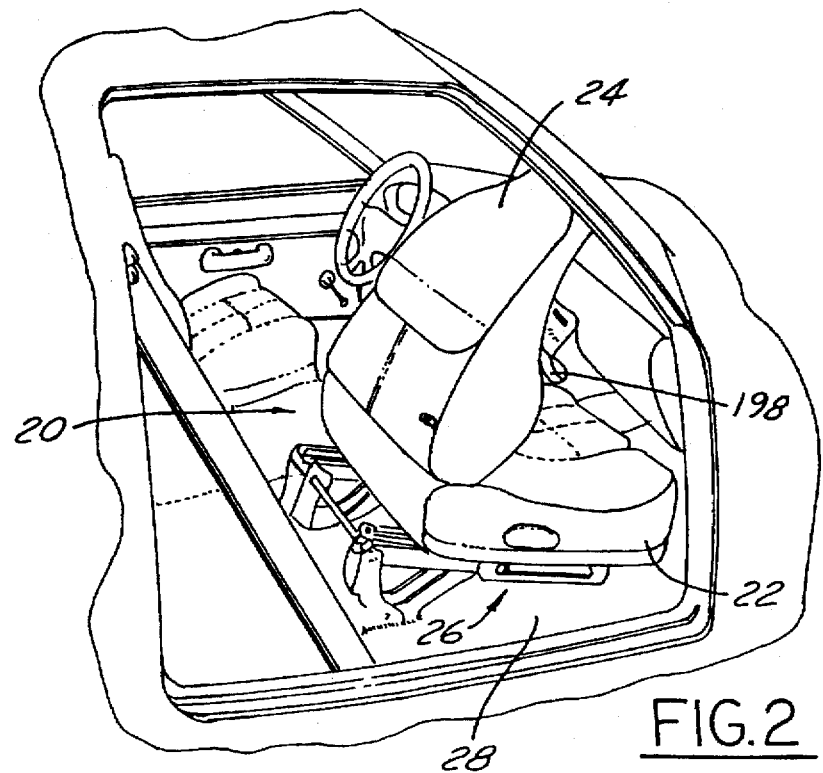
FIG. 2 is a fragmentary perspective view, similar to FIG. 1, showing the seat assembly in its easy entry dump position.

Referring now to FIG. 1 of the drawings, numeral 20 generally indicates a vehicle conventional bucket-type seat assembly, including a lower seat cushion 22, an upright seat back 24, and a seat adjuster arrangement 26 mounted on a vehicle floor 28. FIG. 2 shows the seat assembly 20 moved on its seat adjuster arrangement to a forward "dump" position from its normal use position of FIG. 1 for easy entry to the rear seat area of the vehicle.

Figure 3:
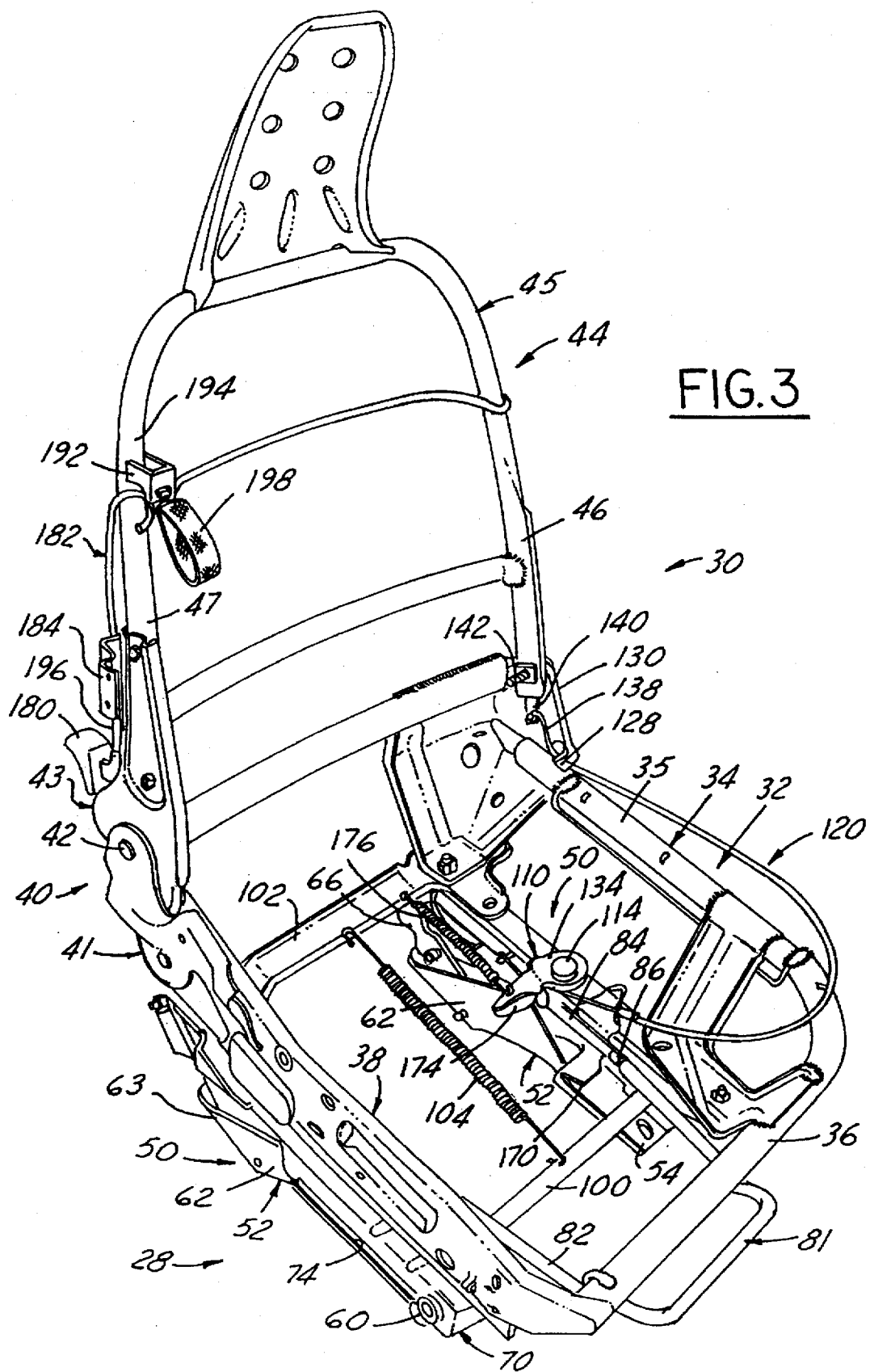
FIG. 3 is an enlarged perspective view of the seat assembly frame and base adjuster in its normal use position.

With reference to FIG. 3, a seat assembly framework 30 is show including a seat cushion frame, generally indicated at 32, including a metal tube 34 bent into an L-shape providing an inboard longitudinal side length 35 and transverse front length 36. An outboard side gusset member 38 connects an outboard end of the tube front length 36 to an outboard rear recliner hinge assembly 40. The hinge assembly 40, shown in FIG. 5, includes a seat cushion hinge-half 41 fixed to an aft end of the side gusset member 38 while being pivotally connected by pin 42 to an seat back hinge-half 43. In FIGS. 3 and 15, a seat back frame, indicated generally by numeral 44, includes a U-shaped metal tube 45, forming lower flattened inboard 46 and outboard 47 end portions, with the outboard end portion 47 fixed to the seat back hinge-half 43.

Figure 15A:
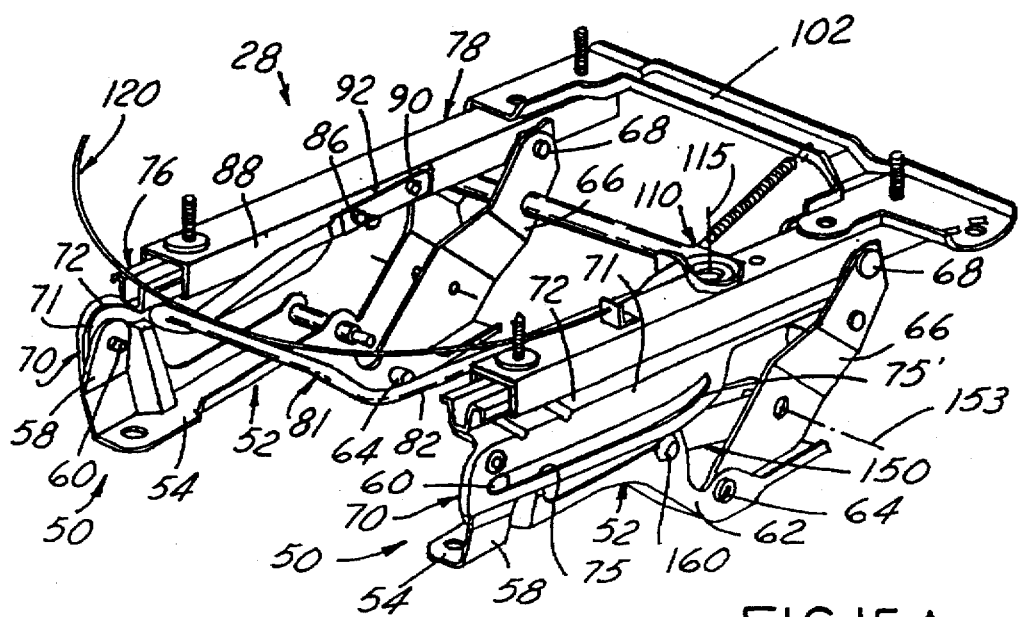
FIG. 15A is an enlarged perspective view of the seat adjustor shown in FIG. 15.
Figure 15:
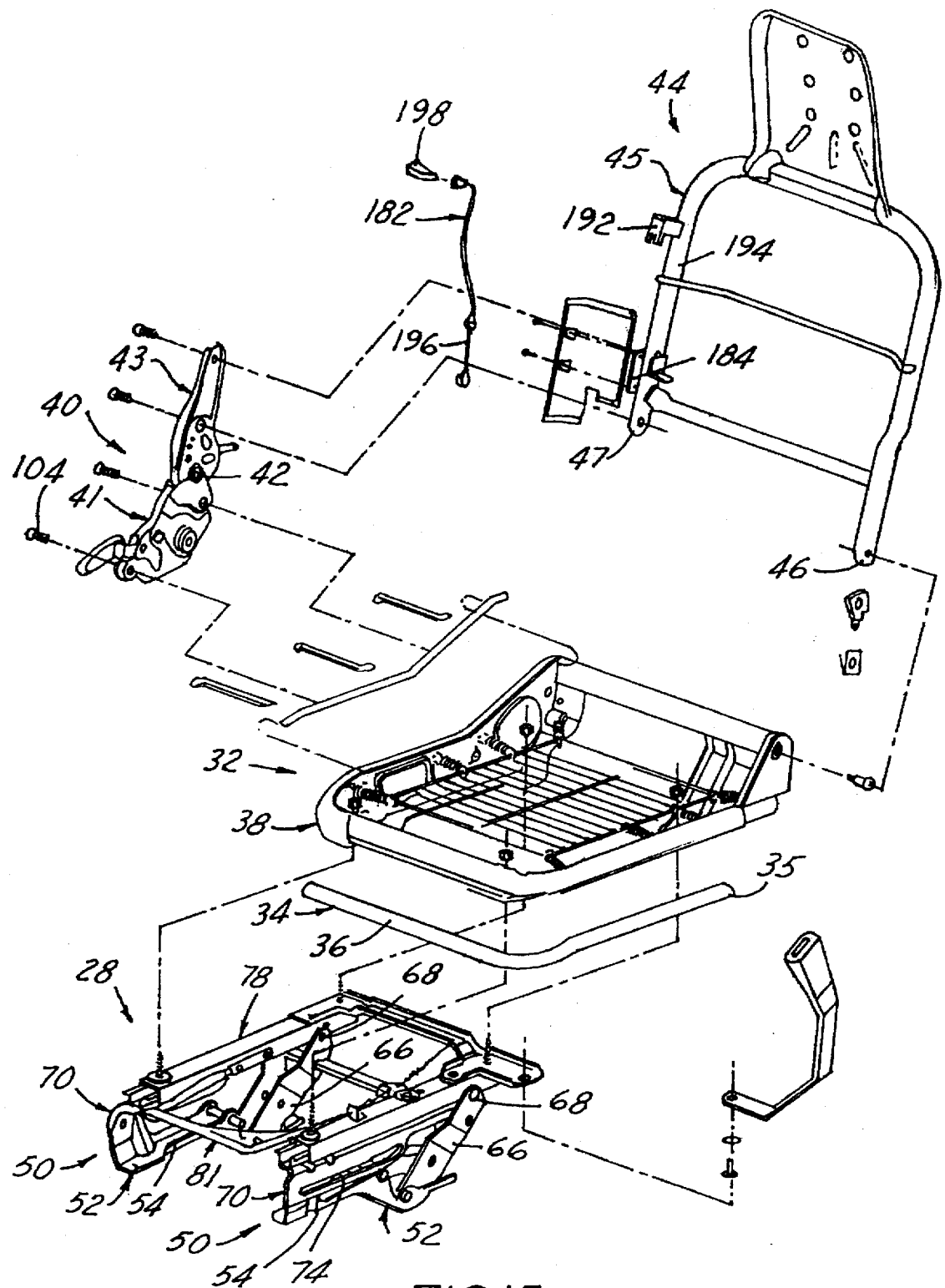
FIG. 15 is a perspective exploded view of the seat frame and seat support assemblies.

Referring to FIGS. 15 and 15A, the seat adjuster arrangement 28 includes inboard and outboard longitudinally extending support assemblies 50. As the support assemblies are substantially identical, the same reference numerals will be used to describe the same or similar elements. Each support assembly has an elongated base member, indicated generally at 52, fixedly mounted on the vehicle floor 26 by suitable fasteners.

As best seen in FIG. 15A, each base members 52 includes a forwardly extending base front bracket 54, adapted for mounting on a raised planar portion 56 of the vehicle floor. Each front bracket is formed with an upstanding strut 58, supporting an elevated transversely extending front pivot bolt connection therethrough, shown at 60 in FIG. 5. It will be noted in FIG. 3 that each base member front bracket 54 is joined at its aft end, as by welding, to a rearwardly and downwardly sloped channel-section angle support brace 62, terminating in an aft foot portion 63 secured to the vehicle floor 28.

Each base assembly foot portion 63 has a rear connecting pin 64, extending transversely therethrough, pivotally supporting a first lower end of a U-section rear link 66 between upstanding channel walls of the brace 62. The rear link 66 has an upper bifurcated end provided with a transverse upper pivot pin 68 rotationally connecting an aft end of an associated longitudinally extending carriage 70.

Figure 5:
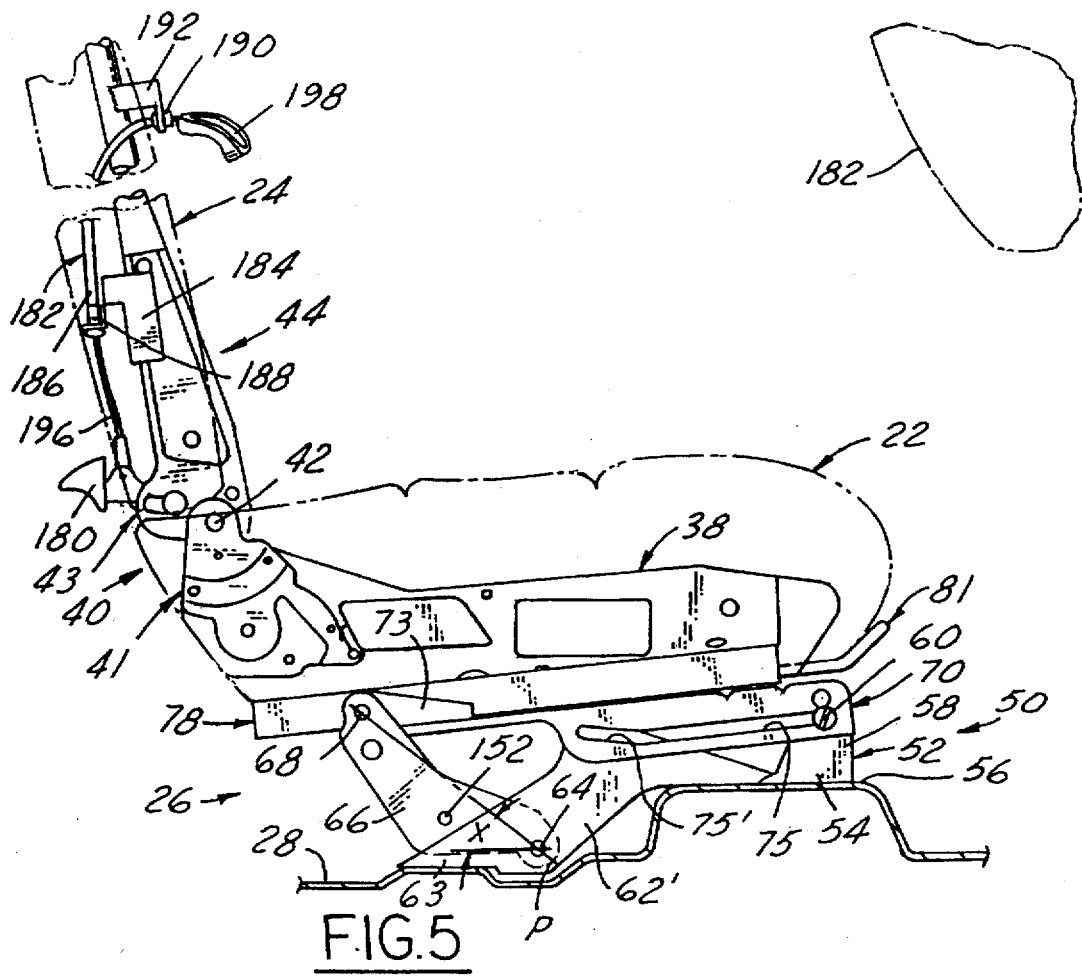
FIG. 5 is a fragmentary side view of the seat assembly frame/and base adjuster shown in its rearmost seating position.
Figure 14:
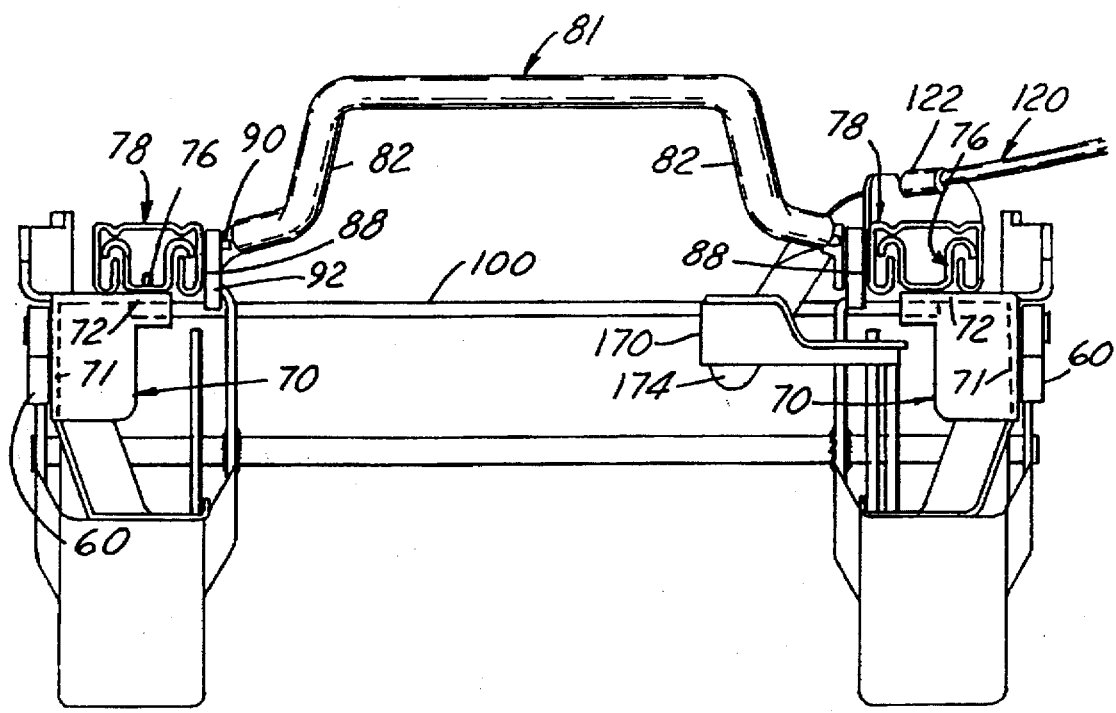
FIG. 14 is an enlarged front view of the inboard and outboard seat support assemblies.

As seen in FIGS. 14 and 15A of the disclosed embodiment, each carriage 70 includes an elongated L-section beam portion defined by a side wall 71 and a top wall 72. FIG. 5 further shows a rear bracket 73, rotationally connected to an associated pivot pin 68, fixedly joined to an underside trailing tongue portion 74 of the carriage. Each side wall 71 is provided with an elongated guide slot 75, terminating at its aft end in a slot portion 75' which is upwardly sloped at a slight acute angle from the forward portion of the guide slot 75.

It will be observed in FIG. 14 that each carriage upper wall 72 is fixed, as by welding, to an underside of an associated lower channel-shaped rail 76. An upper inverted U-shaped track member 78, slidably supported on its associated lower rail 76, carries a conventional track latch member, not shown, movable between an upper latched position engaging rail 76 and a lower unlatched position disengaged from the rail. Reference may be made to U.S. Pat. No. 4,961,559 to Raymor, which teaches a conventional seat track latching arrangement.

In FIG. 5 the outboard carriage guide slot 75 is shown receiving therethrough an associated elevated pivot bolt 60, wherein the bolt 60 at the slot front limit position with the seat assembly 20 in its rearmost normal use mode. It will be noted in FIGS. 9 and 10 that with the seat in its forward easy-entry dump position pivot bolt 60 is located at the rear limit position of its associated carriage slot angled portion 75'.

Figure 4:
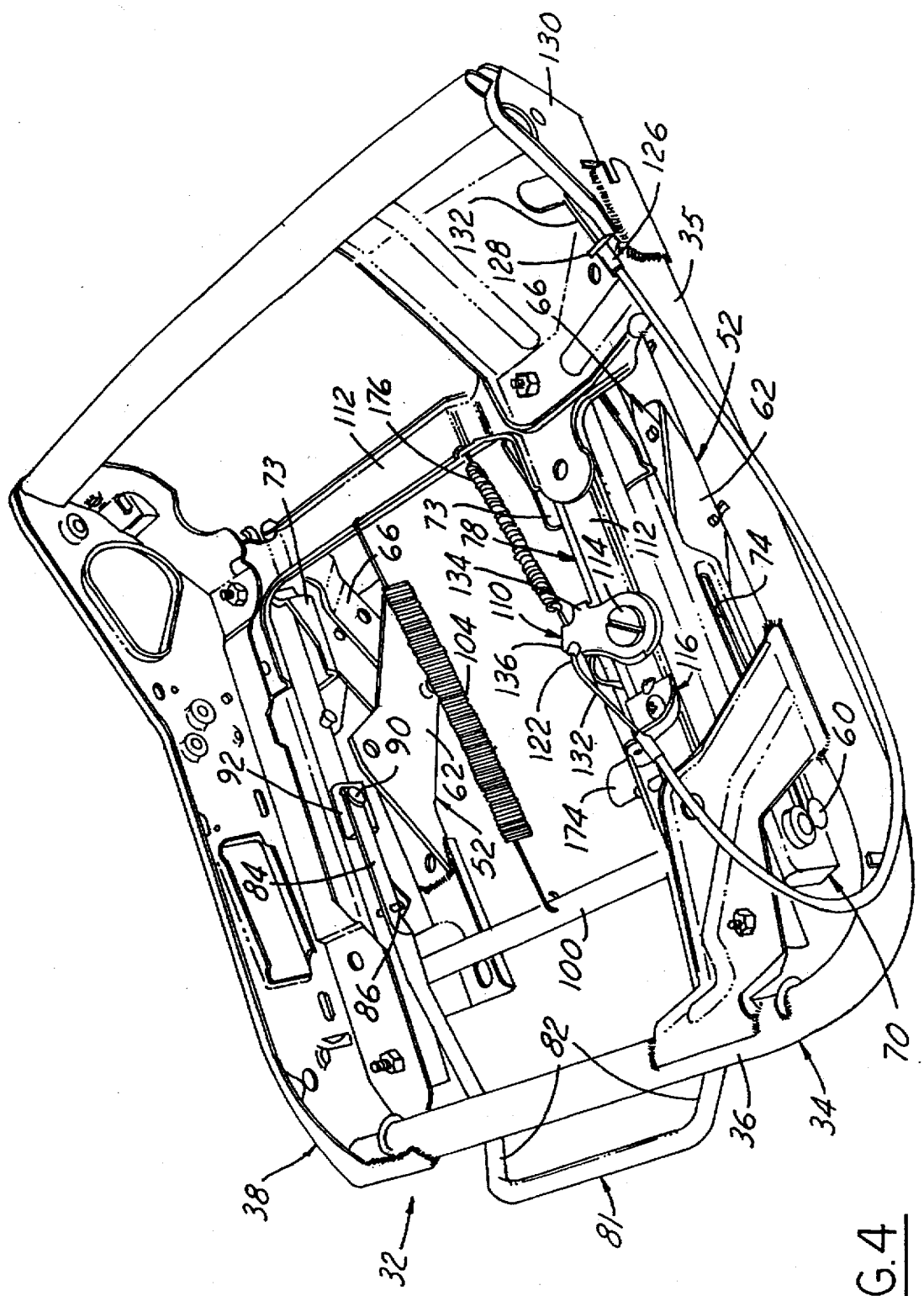
FIG. 4 is an enlarged perspective view of the seat cushion frame and base adjuster in its normal position.

Referring to FIG. 3, a generally U-shaped track adjustment lever handle 81 includes a pair of rearwardly extending side bars 82, each terminating in a flattened end portion 84. The parallel flattened portions 84 are each attached by a handle pivot pin, shown at 86 in FIG. 13, to an inner side wall 88 of an associated upper track. As seen in FIG. 4, each inboard flattened portion 84 has its free end provided with a transversely extending track latch pin 90 supporting a block-shaped track latch 92. Each track latch 92 has a conventional latching portion, not shown, extending through an opening in its associated track member inner side wall 88. Such track latch portions control the travel of its associated track member 78 along its associated lower rail 76 by being biased into locked engagement with the rail.

Figure 12:
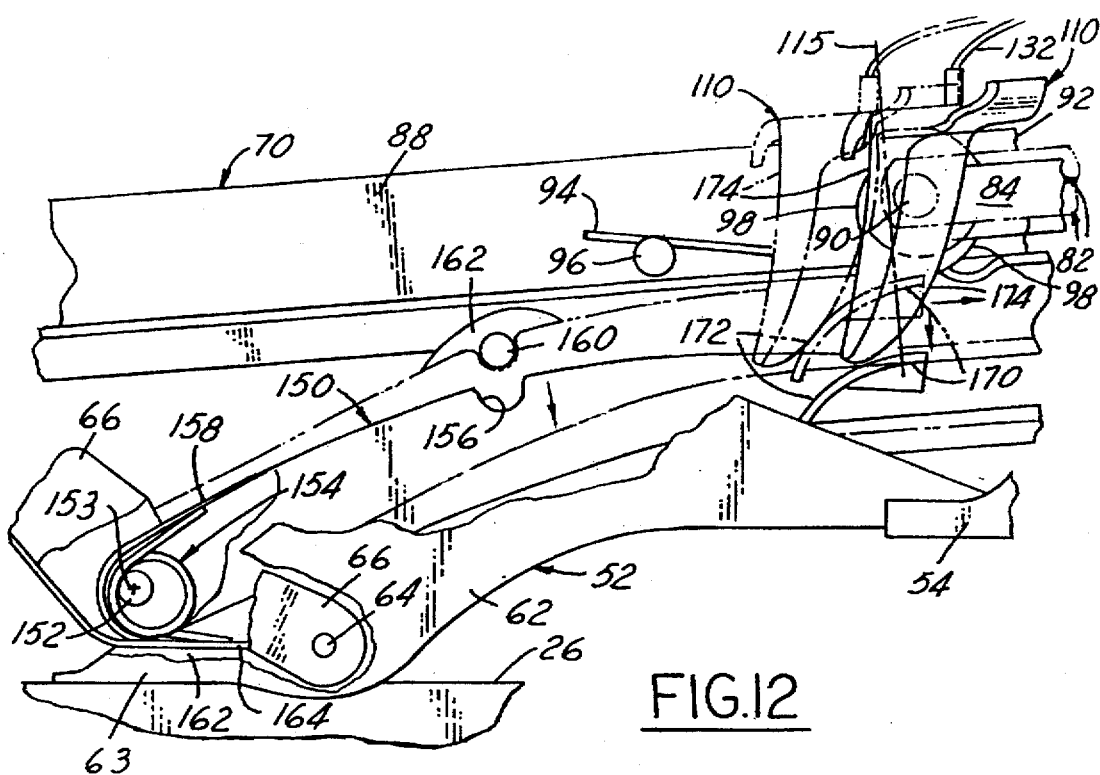
FIG. 12 is an enlarged fragmentary view of the seat inboard mounting base easy-entry dump mechanism.
Figure 12A:
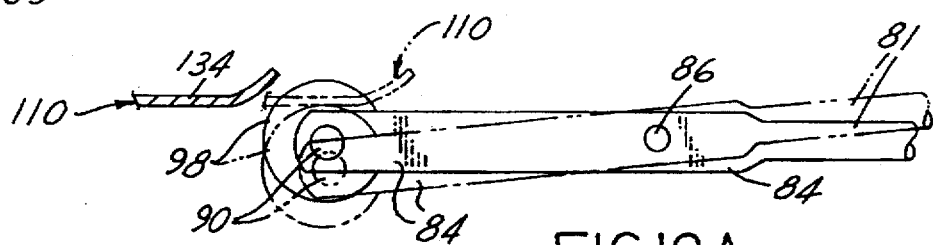
FIG. 12A is an enlarged fragmentary view of the disc wheel roller shown in FIG. 12.
Figure 13:
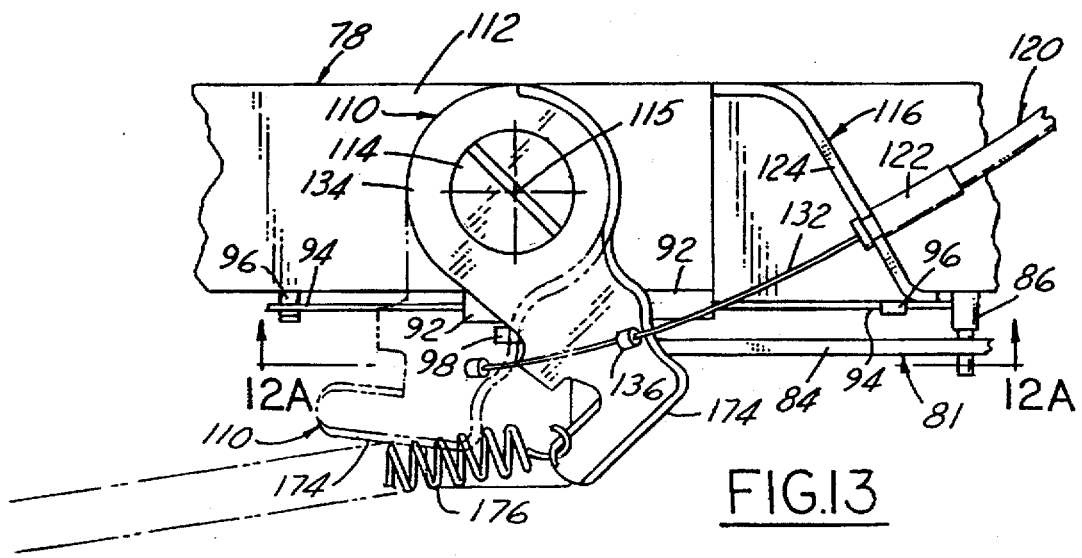
FIG. 13 is an enlarged fragmentary plan view of the easy-entry dump mechanism shown in FIG. 12.

In FIG. 12 the inboard track latch 92 is shown normally spring loaded upward, by a spring wire length 94, into engagement with its upper track. FIGS. 12 and 13 show one spring wire length 94, supported on track member side wall 88 by a pair of longitudinally spaced pins 96, with the wire length extending through its associated track latch 92. A seat occupant adjusts the seat position by raising the handle 81 about its pivot pins 86, thereby pivotally urging the track latches 92 downward against the spring bias of their associated wire length 94, unlatching each track member 78 from its associated rail 76. FIGS. 12A and 13 show a disc wheel roller 98, positioned between the handle inboard flattened portion 84 and inboard track latch 92, with the wheel 98 pivoted in a free rotating manner on inboard latch pin 90.

FIGS. 4 and 14 illustrate a seat adjuster arrangement including a front cross strap 100, with each strap end bolted to an underside of an associated carrier horizontal flange 72, while a rear cross strap 102 has each of its ends bolted to an associated upper track member 78. A tension helical spring 104 is shown in FIG. 4 fully extended when the upper track members 78 are in their full rearward positions of FIGS. 5 and 6. The spring 104 provides a load on the upper seat tracks 78 which automatically causes the upper track members 78 to travel to their full forward position on their associated rails when the track latches 92 are released.

Referring to FIG. 4, a cam member 110 is shown mounted on to top wall 112 of inboard upper track member 78 by pivot bolt 114 for rotation about bolt principal axis 115, shown in FIGS. 12 and 13. A cable attachment bracket 116 is riveted to the inboard top wall 112 slightly forward of the cam latch 110. FIG. 13 shows an operating cable 120, having a cable sheath first end 122 anchored to upstanding flange 124 of the cable bracket 116, while cable sheath second end 126 is shown anchored to an upstanding tab 128, struck from inboard hinge ear 130 of the seat cushion frame. The cable sheath surrounds a cable core 132 having one end attached to cam member pivot plate 134 at a plate hole 136. The cable core 132 other end, shown in FIG. 3, is attached to set back frame tab 140 which projects downwardly from seat back outboard pivot bolt 142.

In FIG. 12 a longitudinally extending latch bracket arm in the form of an inverted channel shaped member, shown generally at 150, has its aft end pivotally connected at an intermediate point of inboard rear pivot link 66 by a bolt 152. It will be observed that the transversely extending rotational axis 153 of the bracket arm pivot pin 152 is disposed in orthogonal relation to the pivot axis 115 of the cam plate 134.

Figure 6:
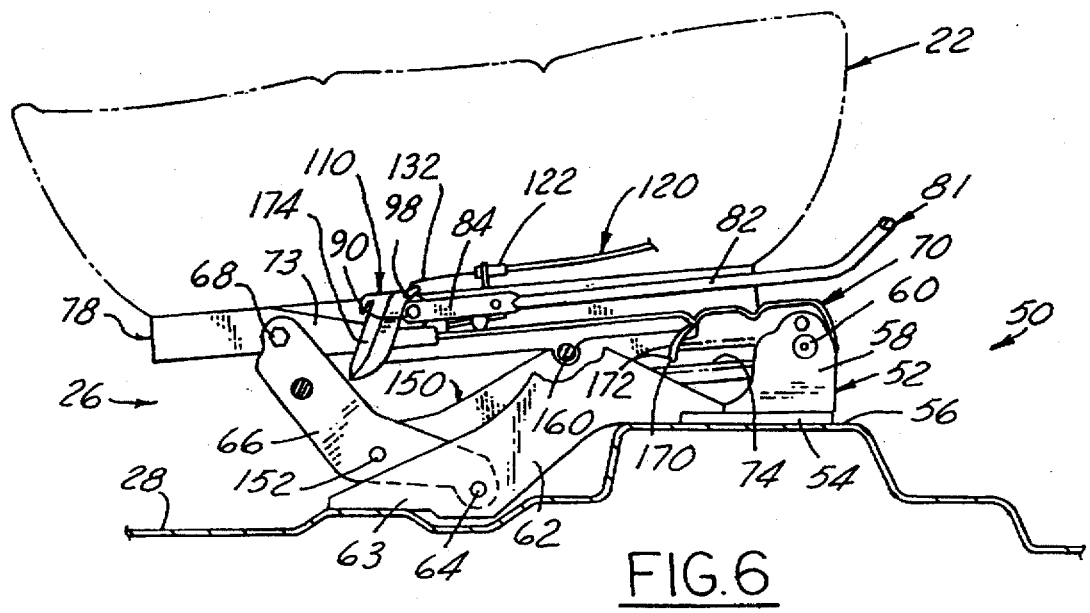
FIG. 6 is a fragmentary cross sectional view of the seat base adjuster taken substantially on the line 6—6 of FIG. 11.
Figure 7:
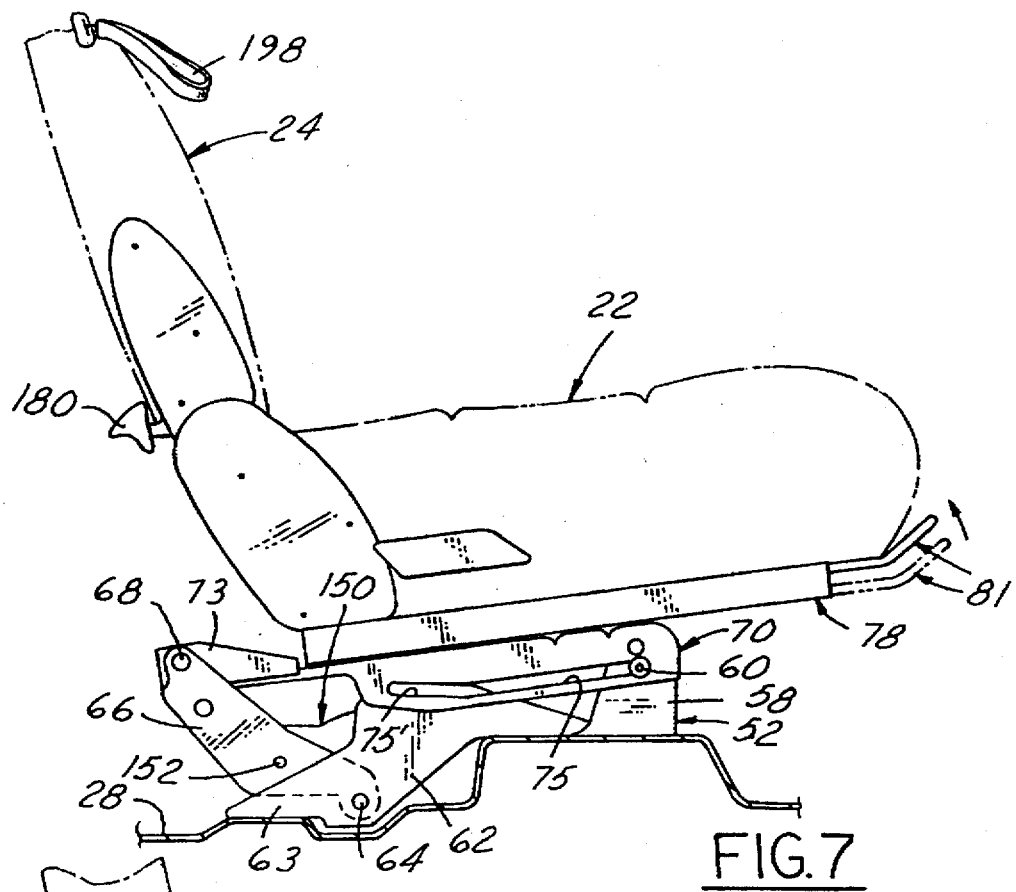
FIG. 7 is a view similar to FIG. 5 showing the seat assembly in its forward-most use position.

The forward rotation of both rear pivot links 66 is controlled by the latch bracket arm 150, which has a pivot bolt 152 encircled by a torsion spring 154. The torsion spring 154 is shown loading the bracket arm in a counter-clockwise upward direction such that a transverse slot 156, cut-out from bracket arm upper bight wall 158, is normally biased into engagement with a transverse cross pin 160. As seen in FIG. 6, the cross pin 160 is supported at the apex 162 of the outboard angle-shaped brace 62. It will be noted in FIG. 12 that the rearward or counter-clockwise rotation of each rear links 66 is limited by an elastomeric stop 162, secured to link bight wall 164, which stop is adapted to contact bight wall 166 of brace 62.

Figure 11:
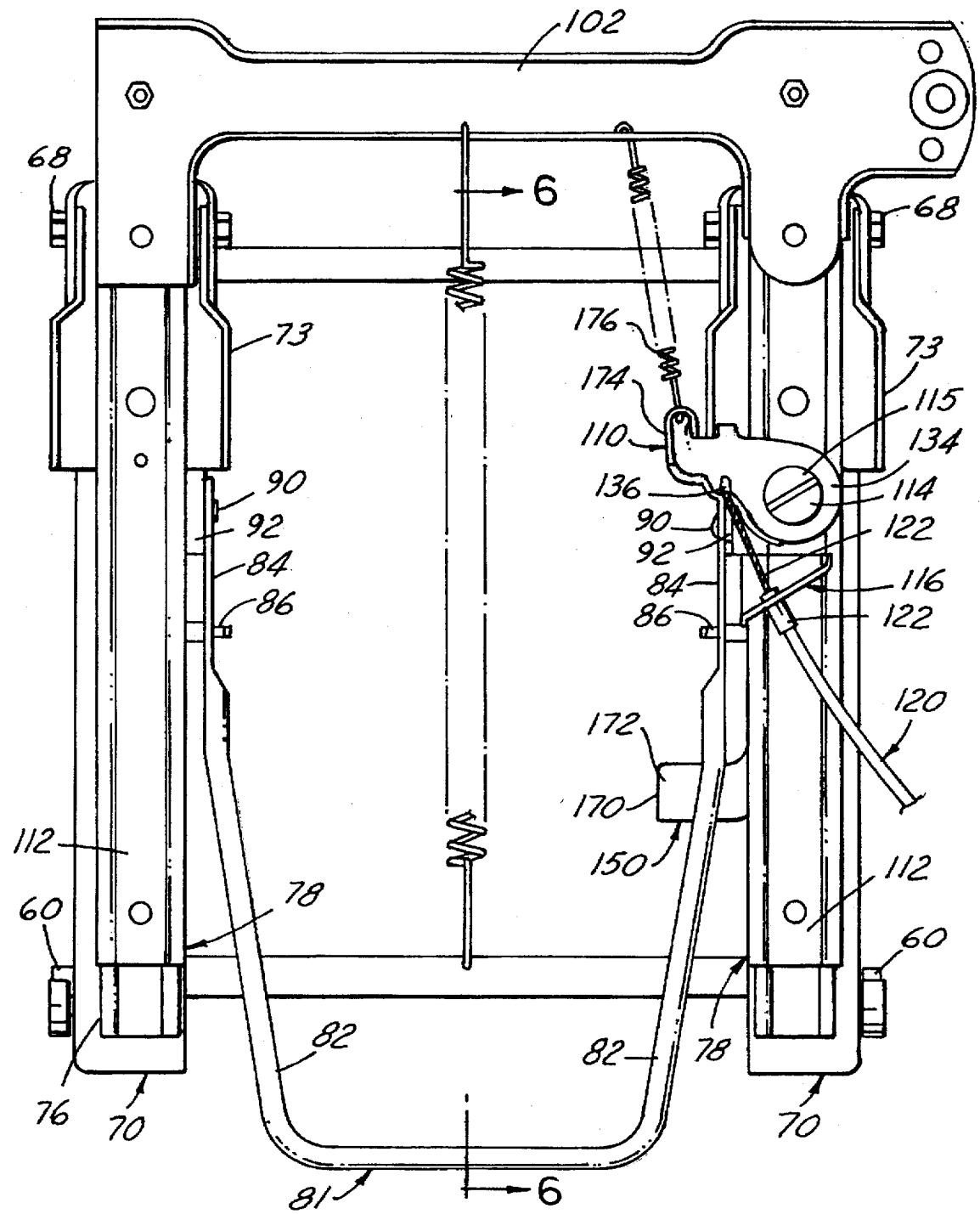
FIG. 11 is a plan view of the seat adjuster in its rearmost use position.

With reference to FIGS. 6 and 11, the latch bracket arm 150 terminates at its forward end in an outboard extending tongue 170, having an arcuate shape in vertical cross section, defining a rearwardly facing radiused cam follower surface 172. As seen in FIG. 12, the cam plate 134 is formed with a downstanding cam finger 174, normally rotationally biased clockwise to an aft position, as viewed in FIG. 11, by a helical tension cam spring 176 connected between the cam member 110 and rear cross member 102. Upon the cam finger 174 being moved into contact the bracket arm, cam follower surface 172 the cam member 110 is rotated in a manner allowing travel of the seat assembly 20 to its forward dump position in a manner to be explained below.

In operation, the seat assembly is actuated upon the recliner dump latch lock lever 180, shown in FIG. 3, being pivoted upwardly to its recliner hinge assembly release position, allowing the seat back 24 to be rotated forward of its normal operating range. An example of a typical easy entry recliner mechanism is disclosed in U.S. Pat. No. 4,607,884 to Heling and reference may be had to the Heling patent for an explanation thereof.

Figure 8:
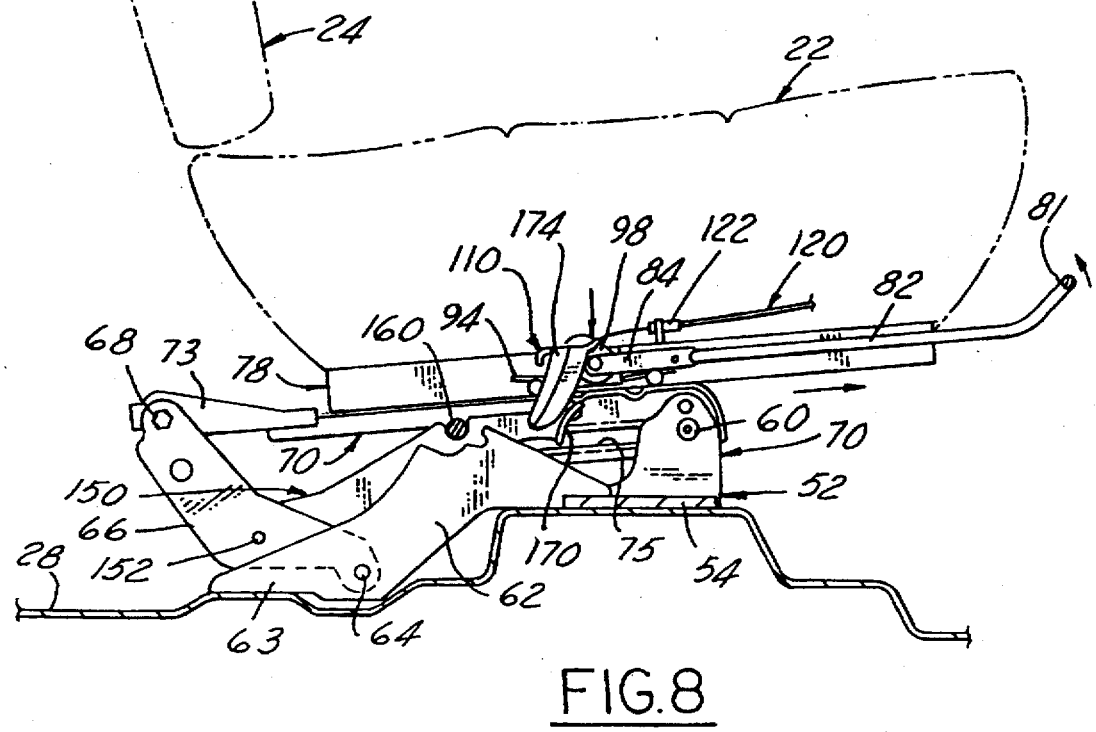
FIG. 8 is a view similar to FIG. 6 showing the inboard seat adjuster in its forward-most use position.

Rotation of the seat back 24 to a forward position slightly past its normal use range causes the cable core 132 to be pulled rearward by seat back tab 140, wherein the stroke of the core rotates the cam member 110 initiating seat assembly travel in two sequential stages. The first stage involves release of the seat track latches 92 by the stroke of the cable core, freeing the upper track members 78 for travel to their full forward use position shown in FIG. 8.

As viewed in FIG. 13, the cable core stroke pulls forwardly on the cam member 110 causing cam plate 134 to rotate counter-clockwise its full-line position. Referring to FIG. 12A, as the cam plate 134 rotates its undersurface passes over roller 98 it urges inboard pin 90, inboard track latch 92, and inboard flattened end portion 84 of the track adjustment handle 81 to travel downward against the resilient bias of spring wire length 94. Such downward travel unlatches the inboard track latch 92 as well as rotating the handle 81 about its pivot pins 86 which also unlatches the outboard track latch 92 by forcing it downward, whereby the tension coil spring 104 pulls on rear cross member 104 causing the track members 78 and seat assembly 20 to travel forward to their FIG. 8 full forward use position.

Upon the upper track members 78 reaching their full forward use position, together with the cam plate finger 174 remaining spring biased in its FIG. 13 forward solid line position, the cam finger 174 will strike the radiused cam follower surface 172 of bracket arm tongue 170 and exert a downward force thereon. As seen in FIG. 12, such downward force rotates bracket arm 150 downward about its pivot pin 152 causing arm slot 156 to disengage from base member cross-pin 160, whereby rear pivot links 66 are free to rotate forward about their lower pivot pins 64.

As the rear links 66 are rotated forwardly, the seat assembly 20 travels forward along a circular arc about their associated rear link lower pivot pins 64 resulting in each carriage guide slot 75 traveling along its elevated pivot bolts 60, as seen in FIGS. 9 and 10. It will be noted in FIG. 9 that the aft end portion 75' of each slot 75 is sloped upwardly at a slight acute angle thereby lowering the seat cushion, allowing forward leg-rest portion 22' to pass under vehicle instrument panel 182 as the rear links 66 reach their forwardly inclined position.

As seen in the seat assembly use position of FIG. 5, each rear link 66 is inclined rearwardly a predetermined acute angle "X" from the horizontal, of the order of 40 degrees in the disclosed embodiment, with the seat assembly adjusted to its rearmost position. It will be noted that the angle "X" is defined between the horizontal and an inclined plane defined by construction line P, which includes the axes of rear link pivot pins 64 and 68. The seat carriages 70 and the upper seat tracks 78 are shown inclined rearwardly and downwardly with the front pivot bolts 60 positioned at their carriage front slot limits.

Referring to FIG. 9, the seat carriages 70 and upper track members 78 are shown in their easy entry dump positions, inclined forwardly and downwardly from their front pivot bolts 60, with the bolt shown positioned at the carriage slot rear limit. It will be observed that the link 66 is inclined forwardly a predetermined angle "Y" from the horizontal, which in the disclosed embodiment is of the order of 70 degrees. Thus, the link 66 is rotated through an angle of the order of 70 degrees from its FIG. 5 use position to its FIG. 9 easy entry dump position.

With reference to FIG. 5, the recliner hinge assembly seat cushion hinge-half 42 includes the operating release lock lever 180 which is pivotally connected to the hinge-half 42 by pivot pin 102. The release lever 180 is connected by a pull-strap cable 182 to a seat back lower bracket 184, fixed to a seat back frame outboard flattened end portion 47, by means of cable sheath 186 being anchored at one lower end 188 to the lower bracket. The cable sheath upper end is anchored at 190 to a seat back upper bracket 192, fixed to an outboard side tube portion 194 of U-shaped tube 45. A pull-strap cable core 196 has its lower end connected to the release lever 180 and its upper end connected to a pull-strap 198. It will be seen in FIG. 1 that the pull-strap is positioned for ready access by a person standing outside the vehicle. By pulling on the pull-strap the release lever 180 is pivoted upwardly, unlatching the seat back, and thereafter the seat back 24 rotates forward moving the seat assembly from a normal use position to its forward easy entry position.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. An adjuster arrangement for adjusting the position of a vehicle seat assembly, said seat assembly having a seat back that is rotatable about a seat cushion from a generally upright use position to a forward easy entry position, said adjuster arrangement comprising:

inboard and outboard support assemblies adapted for mounting to a vehicle floor, each said support assembly having a longitudinal base adapted to be fixed to the floor providing an upstanding strut at its front end supporting an elevated front pivot, a rear link having a lower end pivoted to an aft end of said base and an upper end pivoted to an aft end of a longitudinal carriage, a guide slot in said carriage receiving said elevated pivot therein allowing carriage slidable travel between front and rear slot limits, a lower rail, fixed on said carriage, slidably supporting an upper track member, fixed to the seat cushion, for longitudinal seat assembly adjustment, whereby with said seat cushion in one of a plurality of adjusted use positions said rear link is inclined rearwardly at a predetermined acute angle with the horizontal, inclining said carriage rearwardly and downwardly from said elevated front pivot;

a recliner hinge assembly, comprising a seat cushion lower-half hinge pivoted to a seat back upper-half hinge, a release lever pivotable on said hinge upper-half adapted for unlocking said hinge assembly for predetermined forward rotational movement of said seat back, whereby first cable means, interconnecting said seat back with a cam plate pivotally mounted on the inboard track member about an upstanding axis of rotation, rotates said plate in a first direction from an inactive position to an active position thereby unlatching inboard and outboard track latches, supported on respective track members, and allowing forward travel of said seat cushion to a full forward use position, spring means operative for biasing said cam plate in a second rotational direction to said inactive position upon the return of said seat back to its use position;

said cam plate including a downstanding finger, operative in said cam plate active position, to engage a forward end follower on a longitudinally extending latch arm, said laugh arm having its aft end pivoted on the rear link of said inboard support assembly for biased arm rotation about a transverse axis, extending orthogonal to said cam plate axis, for latched engagement with its associated base, whereby upon said cam plate finger engaging said follower, pivoting said arm out of latched engagement and freeing each said rear link to rotate about its lower end pivot to a forwardly inclined position defining a predetermined acute angle with the horizontal, each said front pivot slides in its associated carriage slot from said front slot limit to said rear slot limit thereby causing each said carriage and seat cushion to be inclined forwardly and downwardly to a seat assembly easy-entry dump position.

2. The seat adjuster arrangement of claim 1 wherein a U-shaped track adjustment handle is formed with a pair of rearwardly extending flattened parallel portions, each said flattened portion pivotally attached by a handle pivot pin to an inner side wall of an associated track member, said flattened portion terminating in an outwardly extending latch pin supporting said track-latch thereon for selective spring biased engagement, via passage means in said track member inner side wall, with said guide rail, a roller pivoted on said latch pin whereby upon rotation of said cam plate in said one direction said plate slidably contacts said roller, thereby urging said roller, together with said inboard track latch and the free end of said handle inboard flattened portion, downward against said inboard track spring bias, whereby said inboard and outboard track latches are unlatched, such that said inboard and outboard track members are free to travel to their forward-most use positions.

3. The seat adjuster arrangement of claim 1 wherein said seat back comprises a seat back frame having an upstanding outboard side frame portion the lower end of which is connected to said seatback upper hinge pull-strap bracket means fixed on said frame portion, pull-strap cable means supported on said bracket means, such that said cable means connects said release lever to a pull-strip protruding from said seat back at a location for ready access by a person outside the vehicle, providing a dual-function easy entry hinge release lever arrangement, wherein the person first pulls on said pull-strap causing said cable means to pivot said release lever upwardly to its unlatched position, and thereafter continued pulling on said pull strap moves said seat assembly from a normal use position to a forward easy entry dump position.

4. The seat adjuster arrangement of claim 1 wherein each said carriage slot terminates at its aft end in an upwardly and rearwardly inclined portion, thereby enabling a forward portion of said seat cushion to pass under the vehicle instrument panel.

5. The seat adjuster arrangement of claim 1 wherein said seat assembly front elevated pivot pin is located at a height a predetermined dimension above the location of each said rear link lower end pivot, whereby said seat assembly is adapted to travel along a circular arc, about each link lower pivot, from its use position to its forward easy entry position.

6. The seat adjuster arrangement of claim 1 wherein each said rear link is adapted to be rotated through an angle of the order of 70 degrees from its rearwardly inclined use position to its forwardly inclined easy entry dump position.

7. The seat adjuster arrangement of claim 1 wherein each said rear link is rearwardly and upwardly inclined at a predetermined acute angle with the horizontal of the order of 40 degrees with the seat assembly in its use position.

8. The seat adjuster arrangement of claim 1 wherein each rear link is forwardly and upwardly inclined at a predetermined acute angle with the horizontal of the order of 70 degrees with the seat assembly in its easy entry dump position.

* * * * *